United States Patent
Chen et al.

(10) Patent No.: US 11,615,159 B2
(45) Date of Patent: Mar. 28, 2023

(54) DATA PROCESSING METHOD FOR MINI APP, APPARATUS, DEVICE AND MEDIUM

(71) Applicant: BEIJING BAIDU NETCOM SCIENCE AND TECHNOLOGY CO., LTD., Beijing (CN)

(72) Inventors: Du Chen, Beijing (CN); Rui Dong, Beijing (CN); Jiwei Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/215,752

(22) Filed: Mar. 29, 2021

(65) Prior Publication Data
US 2021/0216606 A1  Jul. 15, 2021

(30) Foreign Application Priority Data
Jul. 21, 2020 (CN) .......................... 202010707464.1

(51) Int. Cl.
*G06F 16/955* (2019.01)
*G06F 16/958* (2019.01)
*H04L 67/146* (2022.01)

(52) U.S. Cl.
CPC .......... *G06F 16/955* (2019.01); *G06F 16/958* (2019.01); *H04L 67/146* (2013.01)

(58) Field of Classification Search
CPC .. G06F 16/9574; G06F 16/955; G06F 16/958; G06F 16/951; H04L 67/146
USPC ........................................................ 709/219
See application file for complete search history.

(56) References Cited

U.S. PATENT DOCUMENTS

| | | | |
|---|---|---|---|
| 11,121,863 B1* | 9/2021 | O'Neill | ..................... H04L 9/14 |
| 2002/0047859 A1* | 4/2002 | Szlam | .................. G06F 16/957 |
| | | | 715/705 |
| 2015/0264049 A1* | 9/2015 | Achilles | ................ H04L 67/306 |
| | | | 726/7 |

(Continued)

FOREIGN PATENT DOCUMENTS

| | | |
|---|---|---|
| JP | 2010282409 | 12/2010 |
| JP | 2011034290 | 2/2011 |

(Continued)

OTHER PUBLICATIONS

"MiniApp Standardization White 1-15 Paper" Sep. 12, 2019.
European Search Report dated Jul. 13, 2021 for European Patent Application No. 21165866.1. 9 pages.

*Primary Examiner* — Jeffrey R Swearingen
(74) *Attorney, Agent, or Firm* — Knobbe, Martens, Olson & Bear, LLP

(57) ABSTRACT

A data processing method and apparatus for a mini app, a device and a medium are provided. An implementation of the method may include: intercepting a request message of the mini app, and sending the request message to a target server, where the request message comes from a technology stack; acquiring returned data targeting at the request message and returned from the target server, where the returned data includes cookie content, field information for indicating storage of the cookie content, and a data set corresponding to the request message; and storing the cookie content into a cookie storage database of the mini app according to the field information, and returning the returned data to the technology stack issuing the request message.

19 Claims, 4 Drawing Sheets

(56) References Cited

U.S. PATENT DOCUMENTS

2015/0350173 A1\* 12/2015 Tanase ................... H04L 63/08
                                                            726/7
2021/0141853 A1\* 5/2021 Whitney ............... G06F 21/604
2021/0201278 A1\* 7/2021 Annamalai ......... H04W 12/068
2021/0336937 A1\* 10/2021 Gao ..................... G06F 21/602

FOREIGN PATENT DOCUMENTS

| JP | 2018097878 | 6/2018 |
|----|------------|--------|
| JP | 6838182 | 2/2021 |
| JP | 2021519981 | 8/2021 |

\* cited by examiner

DATA PROCESSING METHOD FOR MINI APP, APPARATUS, DEVICE AND MEDIUM

CROSS-REFERENCE TO RELATED APPLICATIONS

This application claims priority to Chinese Patent Application No. 202010707464.1, filed with the China National Intellectual Property Administration (CNIPA) on Jul. 21, 2020, the contents of which are incorporated herein by reference in their entirety.

TECHNICAL FIELD

The present disclosure relates to the field of Internet, particularly to the field of mini app technology, and more particularly to a data processing method for a mini app, an apparatus, a device and a medium.

BACKGROUND

Mini app is a runtime ecology that can work purely off line by means of physical separation of a rendering layer and a logic layer. Based on DSL (Domain Specific Language) syntax extended based on the standard JS (JavaScript), and with the aid of NA (Native) capability, the mini app has been favored by developers due to the development efficiency closer to H5 and the user experience infinitely close to NA.

The ecological construction mode of the mini app determines that a technology stack of the mini app is composed of three parts: a JS virtual machine (logic layer), WebView (rendering layer) and a client native capability side (that is, NA capabilities, including client capabilities and NA components). However, at present, only in a logic layer scenario, the acquisition and storage of a cookie can be achieved through developer's self-maintenance. In other scenarios with WebView and NA capabilities, the session cannot be managed through the cookie of the mini app, thus causing certain technical troubles to the implementation of mini app services (for example, functions such as paying for resources such as images and videos) under these scenarios.

SUMMARY

The present disclosure provides a data processing method and apparatus for a mini app, a device and a medium to manage a session through a cookie in the form of the mini app.

In a first aspect, an embodiment of the present disclosure provides a data processing method for a mini app. The method includes: intercepting a request message of the mini app, and sending the request message to a target server, where the request message comes from any technology stack; acquiring returned data targeting at the request message and returned from the target server, where the returned data includes cookie content, field information for indicating storage of the cookie content, and a data set corresponding to the request message; and storing the cookie content into a cookie storage database of the mini app according to the field information, and returning the returned data to the any technology stack issuing the request message.

In a second aspect, an embodiment of the present disclosure provides a data processing apparatus for a mini app. The apparatus includes: an interception module, configured to intercept a request message of the mini app, and send the request message to a target server, where the request message comes from any technology stack; an acquisition module, configured to acquire returned data targeting at the request message and returned from the target server, where the returned data includes cookie content, field information for indicating storage of the cookie content, and a data set corresponding to the request message; and a storage module, configured to store the cookie content into a cookie storage database of the mini app according to the field information, and return the returned data to the any technology stack issuing the request message.

In a third aspect, an embodiment of the present disclosure provides an electronic device. The electronic device includes: at least one processor; and a memory communicatively connected with the at least one processor; where the memory stores instructions executable by the at least one processor, and the instructions, when executed by the at least one processor, cause the at least one processor to execute the data processing method for a mini app according to any one of embodiments of the first aspect.

In a fourth aspect, an embodiment of the present disclosure provides a non-transitory computer-readable storage medium. The non-transitory computer-readable storage medium stores computer instructions thereon, where the computer instructions, when executed by a processor, cause the processor to perform the data processing method for a mini app according to any one of embodiments of the first aspect.

According to the technical solution of the present disclosure, the cookie storage and carrying behaviors of different technology stacks in the mini app are unified to provide developers with a penetrating cookie mechanism, so as to manage a session through the cookie in the form of the mini app.

It should be understood that the content described in this section is neither intended to identify key or important features of the present disclosure, nor intended to limit the scope of the present disclosure. Other features of the present disclosure will become understandable through the following description, and other effects of the above-mentioned optional modes will be described below in conjunction with specific embodiments.

BRIEF DESCRIPTION OF THE DRAWINGS

The accompanying drawings are used to better understand the solution and do not constitute limitations to the present disclosure. In the figures.

DETAILED DESCRIPTION OF EMBODIMENTS

Embodiments of present disclosure will be described below in detail with reference to the accompanying drawings. It should be appreciated that embodiments described herein are merely used for explaining the relevant disclosure, rather than limiting the disclosure. Therefore, those skilled in the art should recognize that various changes and modifications may be made to embodiments described herein without departing from the scope and spirit of the present application. Similarly, for the sake of clarity and conciseness, the description of well-known functions and structures will be omitted in the following description.

Figure 1:
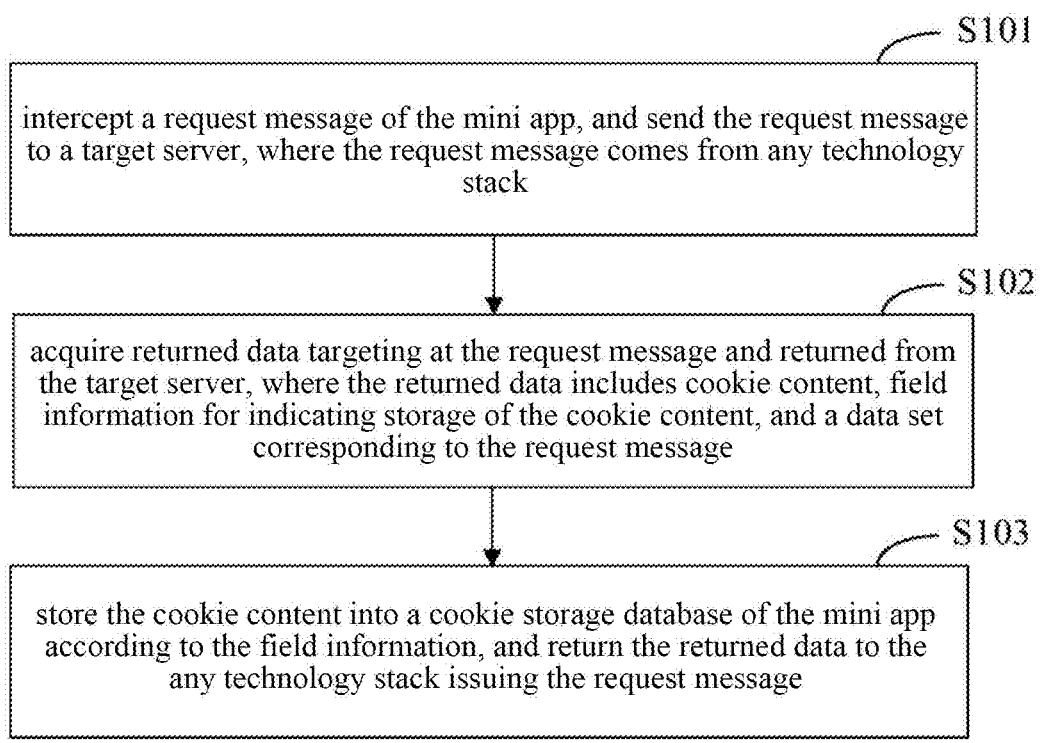
FIG. 1 is a schematic flowchart of a data processing method for a mini app according to an embodiment of the present disclosure.

FIG. 1 is a schematic flowchart of a data processing method for a mini app according to an embodiment of the present disclosure. This embodiment is applicable to a situation where a cookie is acquired and stored under the mini app form. The method may be executed by a data processing apparatus for a mini app. The apparatus is implemented by means of software and/or hardware, and is preferably configured in an electronic device, such as a mobile intelligent terminal or a computer device. As shown in FIG. 1, the method may include following steps:

S101: intercepting a request message of the mini app, and sending the request message to a target server, where the request message comes from any technology stack.

Any technology stack may send the request message, and the technology stack includes at least one of the following: a logic layer, a web view layer, or a client capability side of the mini app. The request from the logic layer is mainly to implement some basic service logics; the request from the web view layer is mainly to implement image loading, rendering, and the like; the client native capability side is relatively wide in range, including client native capabilities and NA components, the client native capabilities include capabilities given to the mini app by a client, the NA components include, for example, a video component, an audio component and an image preview component, and the request from the client capability side is issued mainly based on the client native capabilities and the NA components. In addition, requests from other technology stacks are also applicable to embodiments of the present disclosure. Embodiments of the present disclosure does not specifically limit the technology stack.

In an embodiment, the request message from any technology stack is intercepted and sent uniformly. The request message includes at least a URL address, the URL address in the request message may be acquired, and the request message is sent to the target server, such as a back-end server of the mini app, according to the URL address.

In an implementation, the request message of the mini app may be intercepted through a network interface of a host client of the mini app. The request (swan.request) from the logic layer is sent through a client network library, the request web view from the web view layer is sent through a network, and the request from the client native capability side is sent by the client component calling a client interface through the network. Therefore, the requests from the three technology stacks may be directly intercepted through the network interface of the client. Of course, there are different implementation methods for how to intercept the request message, and any one of the existing technologies can be used for implementation, which is not limited here.

S102: acquiring returned data targeting at the request message and returned from the target server, where the returned data includes cookie content, field information for indicating storage of the cookie content, and a data set corresponding to the request message.

After acquiring the request message, the target server adds the corresponding cookie content to the returned data, and returns the cookie content together with the data set to the mini app on the terminal. The target server can acquire the corresponding cookie content according to the user information carried in the request message. The data set includes data related to the service requested in the request message.

In addition, the returned data further includes field information for indicating the storage of the cookie content. The purpose is to allow the host client of the mini app to store, after receiving the returned data, the cookie content according to the field information.

S103: storing the cookie content into a cookie storage database of the mini app according to the field information, and returning the returned data to the any technology stack issuing the request message.

The cookie storage database is created in advance according to an ID of the mini app. For example, when an mini app is started, the host client of the mini app obtains ID of the mini app by parsing the development kit of the mini app, then creates corresponding cookie storage databases according to IDs of different mini apps, and divides storage paths according to the unique IDs of the mini apps, thereby ensuring that the cookie data between different mini apps is stored in independent sandboxes and does not interfere with each other.

Further, since the same URL access address may also include a plurality of different domain names. Therefore, in the cookie storage database, storage paths can also be further divided according to the domain names. After the domain name of the URL in the request message is determined, the cookie content is stored in the cookie storage database according to the domain name, and does not interfere with each other.

It should be noted here that a cookie can only be acquired and written by means of developer's self-maintenance and for the request of the logic layer (swan.request). The three parts of the mini app, that is, the logic layer, the web view layer, and the client native capability side, do not uniformly store and carry cookies in the CS (client-server) request. The mini app server cannot manage a session through the cookie of the mini app, thus causing certain troubles to the implementation of mini app services (for example, functions such as paying for resources such as images and videos). In embodiments of the present disclosure, the cookie storage and carrying behaviors of the logic layer, the web view layer, and the client native capability side in the mini app are unified, the request message issued by any technology stack is uniformly intercepted and processed, and the cookie content is uniformly stored according to the returned data of the server, so as to manage the subsequent session through the stored cookie content, provide developers with the ability to enable cookies among different technology stacks, and solve the problem that existing developers cannot implement mini app services under the mini app forms by means of the cookie session function. For example, functions such as paying for resources such as images and audios/videos in the mini apps can be implemented by means of cookie sessions in embodiments of the present disclosure. Regardless of the request from which technology stack, the cookie can be acquired, and functions such as payment that cannot be implemented in the prior art can be implemented in the cookie session.

According to the technical solution of embodiments of the present disclosure, the cookie storage and carrying behaviors of different technology stacks in the mini app are unified to provide developers with a penetrating cookie mechanism, so as to manage a session through the cookie under the mini app form. In addition, for cookie storage, in order to protect the security of cookie data between mini apps, paths are divided according to the IDs of the mini apps, and cookie storage sandboxes are provided for the mini apps to ensure the security of cookie data between different mini apps and ensure that the data will not be tampered.

Figure 2:
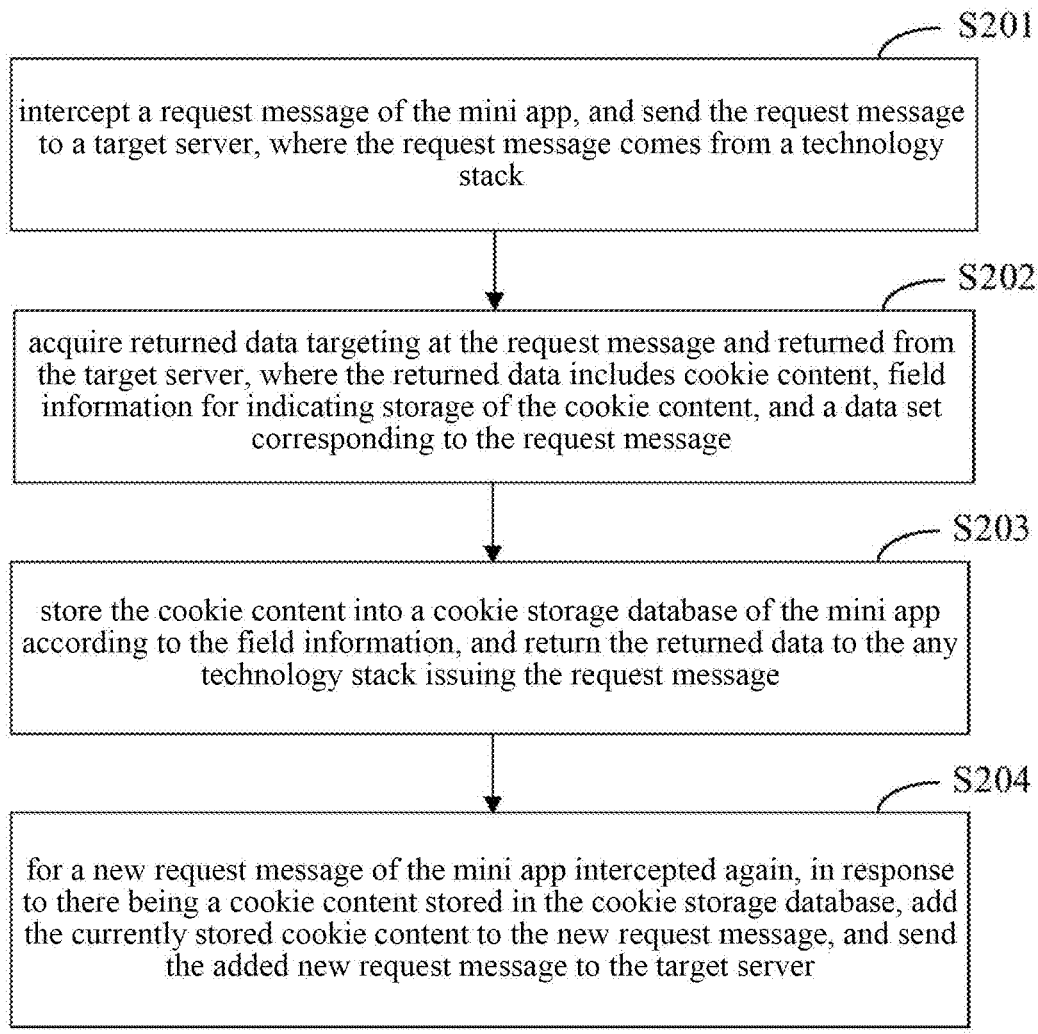
FIG. 2 is a schematic flowchart of a data processing method for a mini app according to an embodiment of the present disclosure.

FIG. 2 is a schematic flowchart of a data processing method for a mini app according to an embodiment of the present disclosure. This embodiment is further optimized on the basis of the foregoing embodiment. As shown in FIG. 2, the method may include the following steps:

S201: intercepting a request message of the mini app, and sending the request message to a target server, where the request message comes from any technology stack.

The technology stack includes at least one of the following: a logic layer of the mini app, a rendering layer of the mini app, and a client native capability side of the mini app.

S202: acquiring returned data targeting at the request message and returned from the target server, where the returned data includes cookie content, field information for indicating storage of the cookie content, and a data set corresponding to the request message.

The field information for indicating storage of the cookie content refers to field information defined by a pre-provided cookie storage interface.

S203: storing the cookie content into a cookie storage database of the mini app according to the field information, and returning the returned data to the any technology stack issuing the request message.

S204: for a new request message of the mini app intercepted again, in response to there being a cookie content stored in the cookie storage database, adding the currently stored cookie content to the new request message, and sending the added new request message to the target server.

Adding the currently stored cookie content to the new request message may include: adding the currently stored cookie content to the new request message through a pre-provided cookie acquisition interface.

The cookie storage interface and the cookie acquisition interface are both interfaces provided in advance for a host client of the mini app, and are used to store and acquire a cookie, respectively. For example, the cookie storage interface is of a setcookie operation, and the cookie acquisition interface is of a getcookie operation. By executing the setcookie operation, the cookie content may be stored under a domain name of a URL in a cookie storage database of the mini app. By executing the getcookie operation, a currently stored cookie content may be added to the new request message, for example, added to a request Header of the request message.

In S204, when the new request message for the mini app is intercepted again, the stored cookie content may be added to the new request message. The cookie content stored under the domain name of the URL in the request message may be added and sent to the target server to manage a session based on the cookie. The server receives the request, generates returned data corresponding to the request according to the cookie content carried in the request and returns the returned data to the client.

According to the technical solution of embodiments of the present disclosure, the cookie storage and carrying behaviors of different technology stacks in the mini app are unified to provide developers with a penetrating cookie mechanism, so as to manage a session based on the cookie in the form of the mini app.

Figure 3:
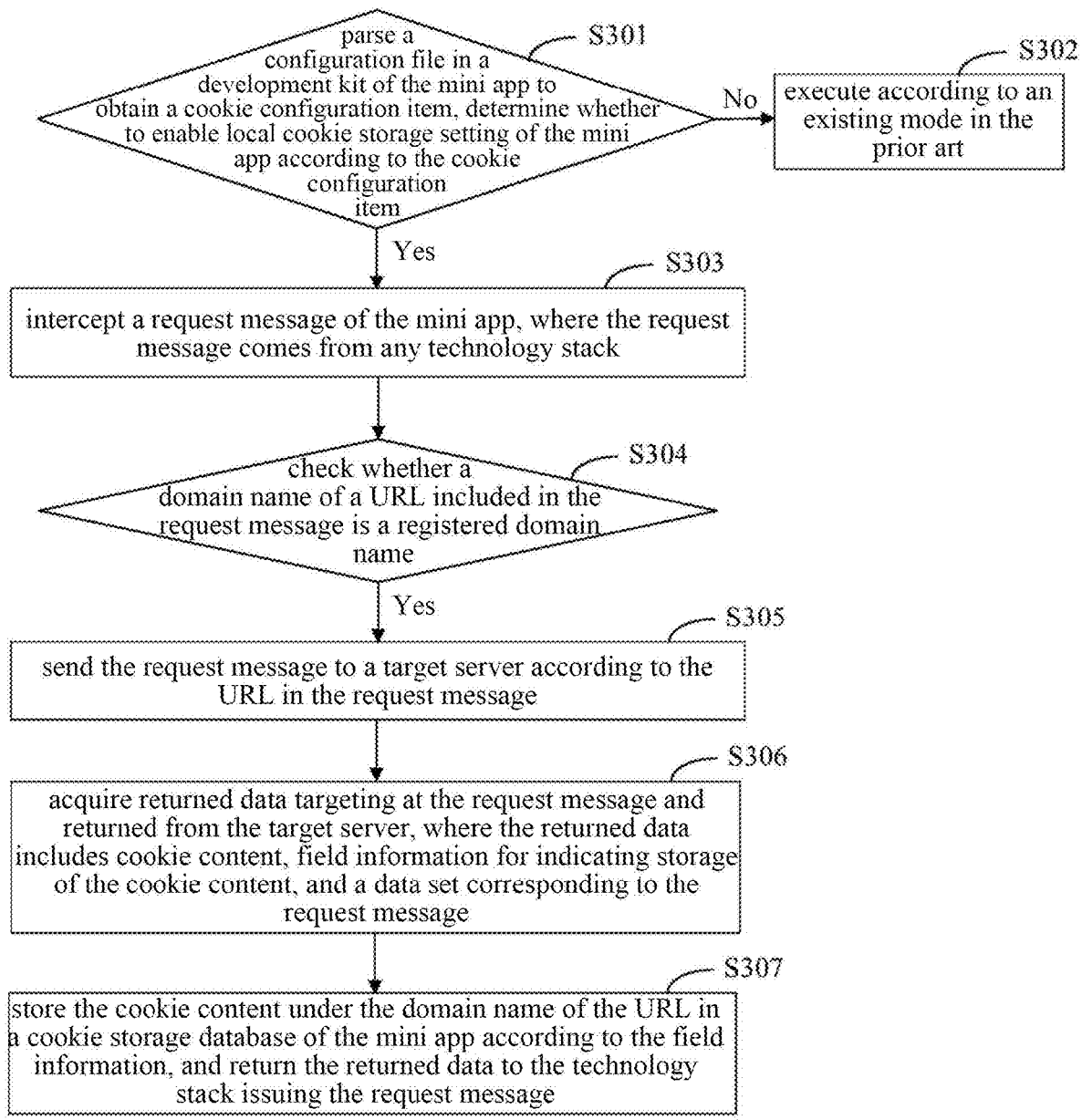
FIG. 3 is a schematic flowchart of a data processing method for a mini app according to an embodiment of the present disclosure.

FIG. 3 is a schematic flowchart of a data processing method for an mini app according to an embodiment of the present disclosure. This embodiment is further optimized on the basis of the foregoing embodiment. As shown in FIG. 3, the method may include following steps:

S301: parsing a configuration file in a development kit of the mini app to obtain a cookie configuration item, determining whether to enable local cookie storage setting of the mini app according to the cookie configuration item, and if yes, executing S303, otherwise executing S302.

Specifically, when developing the mini app, the developer may add the cookie configuration item to app.json of the development kit of the mini app, where the configuration item is used to describe whether to enable the local cookie storage setting of the mini app. Therefore, after parsing the app.json in the development kit of the mini app, a host client of the mini app may identify and confirm, according to the cookie configuration item, whether to enable a function of unifying cookies currently. Of course, if the developer does not want to use the function of unifying cookies, this configuration item does not need to be added. Thus, through the setting of the configuration item, the expression mode of the developer is increased, and the original old existing mode is supported while the function of unifying cookies is supported, which provides the developer with better flexibility.

S302: executing according to an existing mode in the prior art.

S303: intercepting a request message of the mini app, where the request message comes from any technology stack.

The technology stack may include at least one of the following: a logic layer, a web view layer, or a client native capability side of the mini app.

S304: checking whether a domain name of a URL included in the request message is a registered domain name, and if the domain name of the URL is a registered domain name, executing S305.

S305: sending the request message to a target server according to the URL in the request message.

For security considerations, in this embodiment, a cookie storage interface provided for developers should be restricted for use, that is, the mini app can only request a service domain name registered on a developer platform by a developer to store cookie content by executing a setcookie operation, so as to meet certain security requirements. Therefore, after intercepting the request message and before sending the request message to the target server, the request message will be checked according to the domain name information carried in the request message. If the domain name thereof is not the service domain name registered in the platform, the request message will not be sent.

S306: acquiring returned data targeting at the request message and returned from the target server, where the returned data includes cookie content, field information for indicating storage of the cookie content, and a data set corresponding to the request message.

S307: storing the cookie content under the domain name of the URL in a cookie storage database of the mini app according to the field information, and returning the returned data to the technology stack issuing the request message.

In an embodiment of the present disclosure, the request issued by any technology stack are uniformly intercepted and processed, the cookie content (the content is acquired via getcookie) under the current request domain name is uniformly added to the request Header and sent to the server, and after the data returned by the server is received, if there is "set-cookie" in the returned data, the cookie content will be acquired and stored under the corresponding domain name, thereby achieving the acquisition and storage of the cookie and achieving the management of a session according to the cookie. For developers, they only need to pay attention to the logic of mini app development itself, which reduces the complexity of mini app development.

According to the technical solution of embodiments of the present disclosure, the cookie storage and carrying behaviors of the logic layer, the web view layer, and the client native capability side of the mini app can be unified to provide developers with a penetrating cookie mechanism. Therefore, the problem that existing developers cannot implement mini app services in the mini app form by means of the cookie session function is solved. In addition, on the premise of unification of cookies, the increase in developer's expression mode can support coexistence with existing modes, which increases flexibility. Moreover, check according to the registered service domain name meets certain security requirements.

Figure 4:
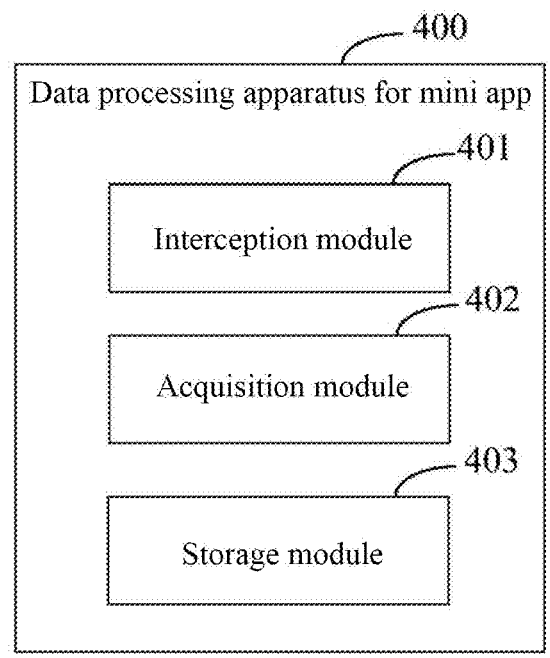
FIG. 4 is a schematic structural diagram of a data processing apparatus for a mini app according to an embodiment of the present disclosure.

FIG. 4 is a schematic structural diagram of a data processing apparatus for a mini app according to an embodiment of the present disclosure. This embodiment is applicable to a situation where a cookie is acquired and stored under the mini app form. The apparatus can implement the data processing method for the mini app according to any embodiment of the present disclosure. As shown in FIG. 4, the apparatus 400 may include:

an interception module 401, configured to intercept a request message of the mini app, and send the request message to a target server, where the request message comes from any technology stack;

an acquisition module 402, configured to acquire returned data targeting at the request message and returned from the target server, where the returned data includes cookie content, field information for indicating storage of the cookie content, and a data set corresponding to the request message; and a storage module 403, configured to store the cookie content into a cookie storage database of the mini app according to the field information, and return the returned data to the any technology stack issuing the request message.

Optionally, the apparatus further includes:

an adding module, configured to, for a new request message of the mini app intercepted again, in response to there being a cookie content stored in the cookie storage database, add the currently stored cookie content to the new request message, and send the added new request message to the target server.

Optionally, the field information for indicating storage of the cookie content refers to field information defined by a pre-provided cookie storage interface.

Optionally, the adding module is further configured to:

add the currently stored cookie content to the new request message through a pre-provided cookie acquisition interface.

Optionally, the interception module is further configured to:

intercept the request message for the mini app through a network interface of a host client of the mini app.

Optionally, the apparatus further includes a check module, further configured to:

before the interception module sends the request message to the target server, check whether a domain name of a URL included in the request message is a registered domain name;

in response to the domain name of the URL being a registered domain name, the interception module executes the operation of sending the request message to the target server.

Optionally, the cookie storage database is created in advance according to an ID of the mini app.

Optionally, the storage module is further configured to:

determine the domain name of the URL in the request message; and store, according to the field information, the cookie content under the domain name of the URL in the cookie storage database of the mini app.

Optionally, the apparatus further includes a parsing module, further configured to:

before the interception module intercepts the request message for the mini app, parse a configuration file in a development kit of the mini app to obtain a cookie configuration item, where the cookie configuration item is used to describe whether to enable local cookie storage setting of the mini app;

in response to confirming that, according to the cookie configuration item, the local cookie storage setting of the mini app is to be enabled, execute the operation of intercepting the request message for the mini app.

Optionally, the technology stack includes at least one of the following: a logic layer, a web view layer, and a client native capability side of the mini app.

Optionally, the mini app includes at least a payment function.

The data processing apparatus 400 for a mini app according to embodiments of the present disclosure may execute the data processing method for a mini app according to an embodiment of the present disclosure, and has corresponding functional modules for executing the method and corresponding beneficial effects. For content not described in detail in this embodiment, reference may be made to the description in any method embodiment of the present disclosure.

According to embodiments of the present disclosure, an electronic device and a readable storage medium are provided.

Figure 5:
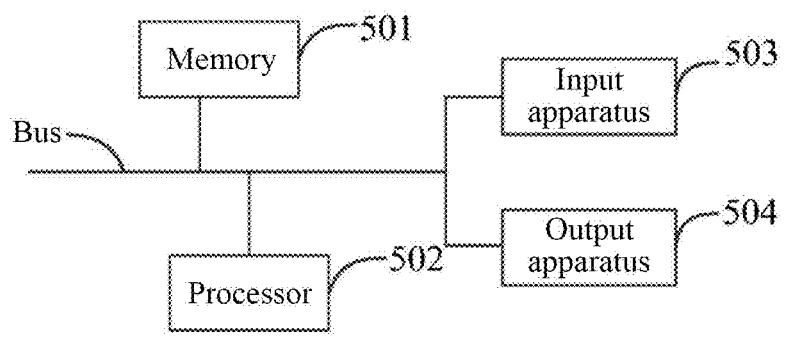
FIG. 5 is a block diagram of an electronic device used to implement the data processing method for a mini app according to embodiments of the present disclosure.

As shown in FIG. 5, which is a block diagram of an electronic device of a data processing method for a mini app according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 5, one processor 501 is used as an example.

The memory 502 is a non-transitory computer readable storage medium provided by an embodiment of the present disclosure. The memory stores instructions executable by at least one processor, so that the at least one processor performs the data processing method for a mini app provided by an embodiment of the present disclosure. The non-transitory computer readable storage medium of the present disclosure stores computer instructions for causing a computer to perform the data processing method for a mini app provided by an embodiment of the present disclosure.

The memory 502, as a non-transitory computer readable storage medium, may be used to store non-transitory software programs, non-transitory computer executable programs and modules, such as program instructions/modules corresponding to the data processing method for a mini app in embodiments of the present disclosure (for example, the interception module 401, the acquisition module 402, and the storage module 403 shown in FIG. 4). The processor 501 executes the non-transitory software programs, instructions, and modules stored in the memory 502 to execute various functional applications and data processing of the server, that is, to implement the data processing method for a mini app in the foregoing method embodiment.

The memory 502 may include a storage program area and a storage data area, where the storage program area may store an operating system and at least one function required application program; and the storage data area may store data created by the use of the electronic device according to the data processing method for a mini app, etc. In addition, the memory 502 may include a high-speed random access memory, and may also include a non-transitory memory, such as at least one magnetic disk storage device, a flash memory device, or other non-transitory solid-state storage devices. In some embodiments, the memory 502 may optionally include memories remotely provided with respect to the processor 501, and these remote memories may be connected to the electronic device of the data processing method for a mini app through a network. Examples of the above network include but are not limited to the Internet, intranet, local area network, mobile communication network, and combinations thereof.

The electronic device of the data processing method for a mini app may further include: an input apparatus 503 and an output apparatus 504. The processor 501, the memory 502, the input apparatus 503, and the output apparatus 504 may be connected through a bus or in other methods. In FIG. 5, connection through a bus is used as an example.

The input apparatus 503 may receive input digital or character information, and generate key signal inputs related to user settings and function control of the electronic device of the data processing method for a mini app, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other. Server can be a cloud server, also known as cloud computing server or virtual machine. It is a host product in cloud computing service system, which solves the defects of traditional physical host and VPS service, such as difficult management and weak business scalability.

According to the technical solution of embodiments of the present disclosure, the cookie storage and carrying behaviors of different technology stacks in the mini app are unified to provide developers with a penetrating cookie mechanism, so as to manage a session based on the cookie under the mini app form. In addition, for cookie storage, in order to protect the security of cookie data between mini apps, paths are divided according to the IDs of the mini apps, and cookie storage sandboxes are provided for the mini apps to ensure the security of cookie data between different mini apps and ensure that the data will not be tampered. In addition, on the premise of unification of cookies, the increase in developer's expression mode can support coexistence with existing modes, which increases flexibility. Moreover, check according to the registered service domain name meets certain security requirements.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A data processing method for a mini app, comprising:
   intercepting a request message issued by a technology stack comprising a logic layer of the mini app, a web view layer of the mini app, or a native capability side of the mini app, and sending the request message to a target server;
   acquiring returned data targeting at the request message and returned from the target server, wherein the returned data comprises cookie content, field information for indicating storage of the cookie content, and a data set corresponding to the request message; and
   storing the cookie content into a cookie storage database of the mini app according to the field information, and returning the returned data to the technology stack issuing the request message, such that the technology stack, issuing the request message, of the mini app manages a cookie session based on the returned cookie content.

2. The method according to claim 1, further comprising:
   for a new request message of the mini app intercepted again, in response to there being a cookie content stored in the cookie storage database, adding the currently stored cookie content to the new request message, and sending the added new request message to the target server.

3. The method according to claim 1, wherein the field information for indicating storage of the cookie content refers to field information defined by a pre-provided cookie storage interface.

4. The method according to claim 2, wherein the adding the currently stored cookie content to the new request message comprises:
   adding the currently stored cookie content to the new request message through a pre-provided cookie acquisition interface.

5. The method according to claim 1, wherein the intercepting the request message of the mini app comprises:
   intercepting the request message of the mini app through a network interface of a host client of the mini app.

6. The method according to claim 1, before sending the request message to the target server, the method further comprises:
   checking whether a domain name of a URL included in the request message is a registered domain name; and
   in response to the domain name of the URL being a registered domain name, executing the operation of sending the request message to the target server.

7. The method according to claim 1, wherein the cookie storage database is created in advance according to an ID of the mini app.

8. The method according to claim 1, wherein the storing the cookie content in the cookie storage database of the mini app according to the field information comprises:
   determining a domain name of a URL included in the request message; and
   storing, according to the field information, the cookie content under the domain name of the URL in the cookie storage database of the mini app.

9. The method according to claim 1, before intercepting the request message of the mini app, the method further comprises:
   parsing a configuration file in a development kit of the mini app to obtain a cookie configuration item, wherein the cookie configuration item is used to describe whether to enable local cookie storage setting of the mini app; and
   in response to confirming that, according to the cookie configuration item, the local cookie storage setting of the mini app is to be enabled, executing the operation of intercepting the request message for the mini app.

10. The method according to claim 1, wherein the mini app comprises at least a payment function.

11. An electronic device, comprising:
    at least one processor; and
    a memory communicatively connected with the at least one processor; wherein,
    the memory stores instructions executable by the at least one processor, and the instructions, when executed by the at least one processor, cause the at least one processor to execute operations comprising:
    intercepting a request message issued by a technology stack comprising a logic layer of the mini app, a web view layer of the mini app, or a native capability side of the mini app, and sending the request message to a target server;
    acquiring returned data targeting at the request message and returned from the target server, wherein the returned data comprises cookie content, field information for indicating storage of the cookie content, and a data set corresponding to the request message; and
    storing the cookie content into a cookie storage database of the mini app according to the field information, and returning the returned data to the technology stack issuing the request message, such that the technology stack, issuing the request message, of the mini app manages a cookie session based on the returned cookie content.

12. The electronic device according to claim 11, wherein the operations further comprise:
    for a new request message of the mini app intercepted again, in response to there being a cookie content stored in the cookie storage database, adding the currently stored cookie content to the new request message, and sending the added new request message to the target server.

13. The electronic device according to claim 11, wherein the field information for indicating storage of the cookie content refers to field information defined by a pre-provided cookie storage interface.

14. The electronic device according to claim 12, wherein the adding the currently stored cookie content to the new request message comprises:
  adding the currently stored cookie content to the new request message through a pre-provided cookie acquisition interface.

15. The electronic device according to claim 11, wherein the intercepting the request message of the mini app comprises:
  intercepting the request message of the mini app through a network interface of a host client of the mini app.

16. The electronic device according to claim 11, before sending the request message to the target server, the operations further comprise:
  checking whether a domain name of a URL included in the request message is a registered domain name; and
  in response to the domain name of the URL being a registered domain name, executing the operation of sending the request message to the target server.

17. The electronic device according to claim 11, wherein the cookie storage database is created in advance according to an ID of the mini app.

18. The electronic device according to claim 11, wherein the storing the cookie content in the cookie storage database of the mini app according to the field information comprises:
  determining a domain name of a URL included in the request message; and
  storing, according to the field information, the cookie content under the domain name of the URL in the cookie storage database of the mini app.

19. A non-transitory computer-readable storage medium, storing computer instructions thereon, wherein the computer instructions, when executed by a processor, cause the processor to perform operations comprising:
  intercepting a request message issued by a technology stack comprising a logic layer of the mini app, a web view layer of the mini app, or a native capability side of the mini app, and sending the request message to a target server;
  acquiring returned data targeting at the request message and returned from the target server, wherein the returned data comprises cookie content, field information for indicating storage of the cookie content, and a data set corresponding to the request message; and
  storing the cookie content into a cookie storage database of the mini app according to the field information, and returning the returned data to the technology stack issuing the request message, such that the technology stack, issuing the request message, of the mini app manages a cookie session based on the returned cookie content.

\* \* \* \* \*